(12) United States Patent
Le Grand

(10) Patent No.: US 6,487,290 B1
(45) Date of Patent: Nov. 26, 2002

(54) CALL ROUTING BASED ON LOCAL STATUS EVALUATION

(75) Inventor: Richard J. Le Grand, Port Jefferson Station, NY (US)

(73) Assignee: Periphonics Corporation, Bohemia, NY (US)

( * ) Notice: Subject to any disclaimer, the term of this patent is extended or adjusted under 35 U.S.C. 154(b) by 0 days.

(21) Appl. No.: 09/300,870

(22) Filed: Apr. 28, 1999

(51) Int. Cl.[7] .............................................. H04M 3/00
(52) U.S. Cl. ............................ 379/265.02; 379/265.11; 379/219
(58) Field of Search ..................... 379/265.01–265.14, 379/266.01–266.1, 309, 201.01, 207.03, 219, 220.01

(56) References Cited

U.S. PATENT DOCUMENTS

| | | | | |
|---|---|---|---|---|
| 5,452,350 A | * | 9/1995 | Reynolds et al. | ...... 379/220.01 |
| 5,546,452 A | | 8/1996 | Andrews et al. | ............ 379/219 |
| 5,915,012 A | * | 6/1999 | Miloslavsky | ........... 379/220.01 |
| 6,393,018 B2 | * | 5/2002 | Miloslavsky | ................ 370/270 |

* cited by examiner

Primary Examiner—Ahmad F. Matar
Assistant Examiner—Benny Q. Tieu
(74) Attorney, Agent, or Firm—Kenneth P. Robinson

(57) ABSTRACT

Call routing is controlled by a central unit providing switching control signals based on selecting the best figure-of-merit value from among poll responses for agents. While an incoming call is held by a public network 12, poll inquiries are sent from a central unit 20. Each local unit 24, 26, 28 provides a poll response indicative of the one its associated response resources (e.g., agents 31, 32, 33) having the shortest queue wait. Each poll response may be a simple figure-of-merit value representing agent availability. Central unit 20 selects the poll response represented by the best figure-of-merit value and sends routing instructions to the network 12. The call is then routed to the appropriate agent for handling. Where a local unit has no associated agent who is qualified to respond to a call (based on caller data related to that call) no poll response need be sent to central unit 20. The simplified processing provided enables system operation with reduced data collection and intra-system communication requirements.

29 Claims, 2 Drawing Sheets

CALL ROUTING BASED ON LOCAL STATUS EVALUATION

RELATED APPLICATIONS (Not Applicable)

FEDERALLY SPONSORED RESEARCH (Not Applicable)

BACKGROUND OF THE INVENTION

This invention relates to automatic routing of incoming calls being held by a network and, more particularly, to systems and methods for routing of incoming telephone calls based on localized evaluation of availability and qualifications of response resources such as individual agents and interactive voice response units.

A variety of automatic call distribution (ACD) systems have been proposed, many with detailed description of the basic technology, system components and related communication network considerations. These prior systems typically focus on the problem of efficiently routing a flow of incoming calls (e.g., "800" type calls) to a finite number of individual agents. At any given time, some agents may be actively engaged in responding to a prior call, while others may be immediately available. The basic objective is to route a caller efficiently and effectively to a qualified agent who is free or has a relatively short queue of waiting calls. A wide range of related objectives, such as providing caller history data for use by the agent, tracking call status, gathering agent performance data, are also addressed by such prior systems.

While capable of meeting many such objectives, prior systems may typically require relatively complex equipment, extensive gathering and analysis of agent status data on a centralized basis, and a considerable volume of inter/intra-system data communication to enable both data collection and control signal transmission.

Objectives of the present invention are, therefore, to provide new and improved call routing systems and methods, and such systems and methods providing one or more of the following advantages and capabilities:

localized evaluation of response resource availability and qualifications;

localized control of call assignments within a local agent group;

centralized switching control based on simplified local status evaluation responses;

centralized figure-of-merit selection without complex selection criteria and analysis;

limited intra-system data reporting; and limited communication and control.

SUMMARY OF THE INVENTION

In accordance with the invention, a call routing system, responsive to an incoming call held by a switching facility, includes a poll/selector responsive to an incoming call and associated caller data (i) to send a poll inquiry to a plurality of evaluate/controllers, (ii) to receive poll responses from at least one evaluate/controller indicating a current capability to respond to that call, and (iii) to provide a switching control signal based on selection of a poll response which meets predetermined criteria. A plurality of response resources (e.g., agents) capable of responding to incoming calls are provided. The system also includes a plurality of evaluate/controllers each arranged to be linked to a group of response resources and each responsive to the poll inquiry to provide a poll response indicative of current availability of a response resource to respond to that call. The poll/selector is arranged to couple the switching control signal to control the routing of the held call from the switching facility.

In such a call routing system each response resource may be an agent at a receiving terminal, a queue serving a group of agents, or an interactive voice response (IVR) system, for example. Each evaluate/controller is typically arranged to provide a poll response indicative of current queue wait for a single response resource capable of responding, based on the content of caller data associated with a particular call. For simplicity, the evaluate/controller may be arranged to provide no poll response in the absence of availability of a linked response resource capable of responding to a particular call. Upon receipt of the poll responses, the poll/selector is arranged to provide a switching control signal indicative of a poll response on the basis of a predetermined criteria, which may be representative of shortest queue wait. Desirably, the switching facility will receive the switching control signal before expiration of the time period during which the switching facility is programmed to hold the incoming call prior to routing.

Also in accordance with the invention, a call routing method, using localized response capability evaluation, includes the steps of:

(a) in response to an incoming call held by a switching facility and associated caller data, sending a poll inquiry from a central location to a plurality of response locations;

(b) at each response location, evaluating the current availability of at least one response resource to respond to that call;

(c) from at least one response location, sending to the central location a poll response indicative of current availability of a response resource to respond to that call;

(d) at the central location, selecting a response location whose poll response meets predetermined criteria;

(e) sending a switching control signal from the central location to control the routing of that call from the switching facility; and (f) at the selected response location, coupling that call to the particular response resource whose current availability to respond was the basis for a poll response from that response location.

For a better understanding of the invention, together with other and further objects, reference is made to the accompanying drawings and the scope of the invention will be pointed out in the accompanying claims.

DESCRIPTION OF THE INVENTION

Figure 1:
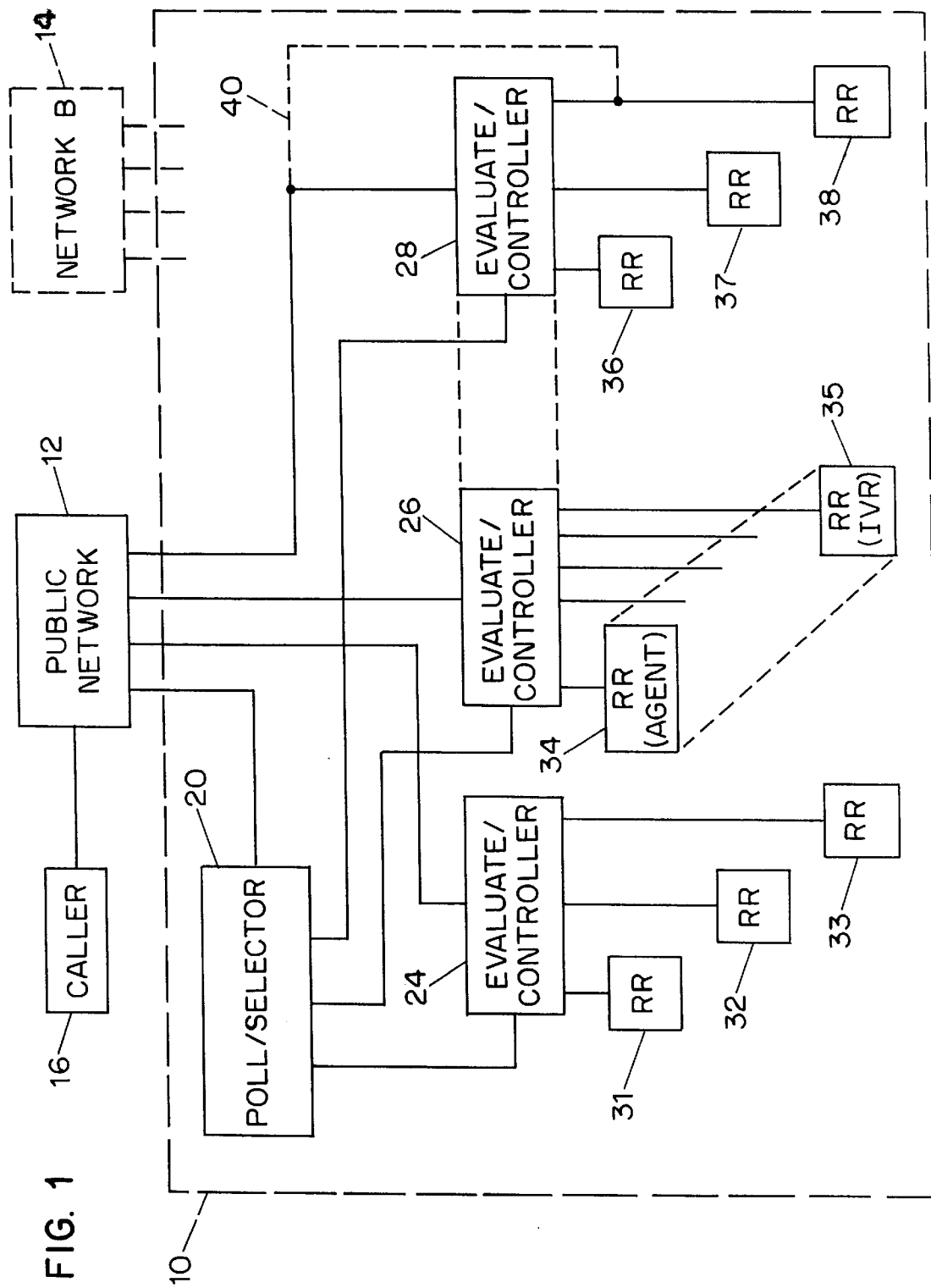
FIG. 1 is a block diagram of a call routing system in accordance with the invention.

FIG. 1 illustrates an embodiment of a call routing system 10 in accordance with the invention. As shown, system 10 is arranged for communication with a switching facility, illustrated as public telephone network 12, and may also be coupled to one or more additional switching facilities, represented by network 14 shown dashed, of any type suitable for implementing two-way communications with callers. An individual caller is represented by box 16, which may typically be a telephone instrument for connection to telephone network 12.

As discussed, a principal objective is to connect caller 16, who may be calling on an 800 type line to inquire about a service or product, to an agent who is both available and qualified to respond with requested information. Thus, the objective is to connect caller 16 to agent 34, for example. As shown, agent 34 is one of a number of response resources 30–38, which are separated into groups, with each group associated with one of evaluate/controller units 24, 26 and 28. There may be any suitable number of evaluate/controller units and resource response agents, and respective ones of such units and agents may be at different physical or geographical locations. Also as shown, each of evaluate/controller units 24, 26, 28 is coupled to poll/selector unit 20. As will become apparent to skilled persons, system 10 may include additional elements and subsystems as appropriate to provide desired operational features and capabilities.

In FIG. 1, unit 20 is a poll/selector responsive to an incoming call being held by the network 12 switching facility. Network 12 may provide the caller's telephone number and other associated caller data to unit 20. Poll/selector 20 is responsive to the incoming call and any associated caller data:

(i) to send a poll inquiry to a plurality of evaluate/controllers (e.g., some or all of units 24, 26, 28);

(ii) to receive poll responses from at least one of evaluate/controllers 24, 26, 28 indicating a current capability to respond to the call; and (iii) to provide a switching control signal indicative of a selected poll response which meets predetermined criteria. It is noted that in this basic configuration the switching control signal identifies (e.g., provides the telephone address of) a particular evaluate/controller unit and does not indicate or identify a specific response resource or agent.

As shown, each evaluate/controller unit 24, 26, 28 is linked via a communication link to each of a group of response resources. Units 24 and 28 are shown each linked to three response resources, 31, 32, 33 and 36, 37, 38, respectively. Unit 26 is conceptually shown to be linked to a larger number of response resources, including agent 34 and interactive voice response (IVR) system 35. Each evaluate/controller 24, 26, 28 responds to the poll inquiry from unit 20 to provide a poll response to unit 20 which is indicative of current capability of one of its linked response resources (e.g., agents) to respond to the call being held by the network. The one agent will typically be the agent who is qualified to respond and currently has the shortest queue wait. In order to accomplish this, using available technology each evaluate/controller may be configured to respond to the call and associated caller data to evaluate both agent availability (e.g., in view of waiting queue for each agent) and agent capabilities (e.g., in view of stored data on each agent's areas of expertise) and then provide a poll response to unit 20.

In an exemplary scenario, poll/selector 20 may receive a poll response from each of the evaluate/controllers 24, 26, 28. The poll responses may take the form of a simple figure-of-merit value. Thus, with the absence of a response predefined as indicating that an evaluate/controller lacks any associated agent who is qualified to respond, the figure-of-merit could be a number from 1 to 9, for example, with "1" indicative of a qualified agent who is currently free and the numbers "2" to "9" indicative of a qualified agent with a shorter or longer queue of waiting callers. If, for example, the unit 24 poll response is "2", the unit 26 poll response is "5" and the unit 28 response is "9", unit 20 need not execute any sophisticated evaluation strategy or optimization algorithm. Unit 20 can simply provide to network 12 a switching control signal indicating that the waiting call is to be routed to evaluate/controller 24 (which provided the best figure-of-merit value). That is to say, unit 20 selects the poll response which meets a predetermined criteria of "lowest figure-of-merit value." Then, upon routing of the call to unit 24, evaluate/controller 24 is arranged to cause that call to be coupled to the particular response resource whose current capability to respond was the basis for the poll response unit 24 provided to unit 20.

In some installations, a group of agents may be served by a common gueue. Then, whenever a specific agent becomes free the next call on the common queue is served by that agent. In such case, it will be seen that the common queue, rather than an individual agent, can be considered to be a response resource for present purposes. It may be desirable in some applications to utilize figure-of-merit values which are representative of the probability of delay in servicing a call if routed to a particular agent or queue. Thus, a figure-of-merit value indicative of a low probability of delay for routing to a particular queue would be basically analogous to a figure-of-merit value indicative of a short present queue wait.

In FIG. 1, an alternative embodiment is represented by dashed line 40, which provides a communication link from network 12 to response resource 38. In this embodiment, the poll response from unit 28 to unit 20 would include both a figure-of-merit value as discussed, and also a response resource identifier. Then, if the figure-of-merit value from unit 28 results in selection of evaluate/controller 28 by unit 20, the switching control signal sent by unit 20 to network 12 can indicate that the waiting call is to be routed directly to response resource 38. Additional variations, configurations and signal formats may be implemented by skilled persons, once having an understanding of the invention.

Figure 2:
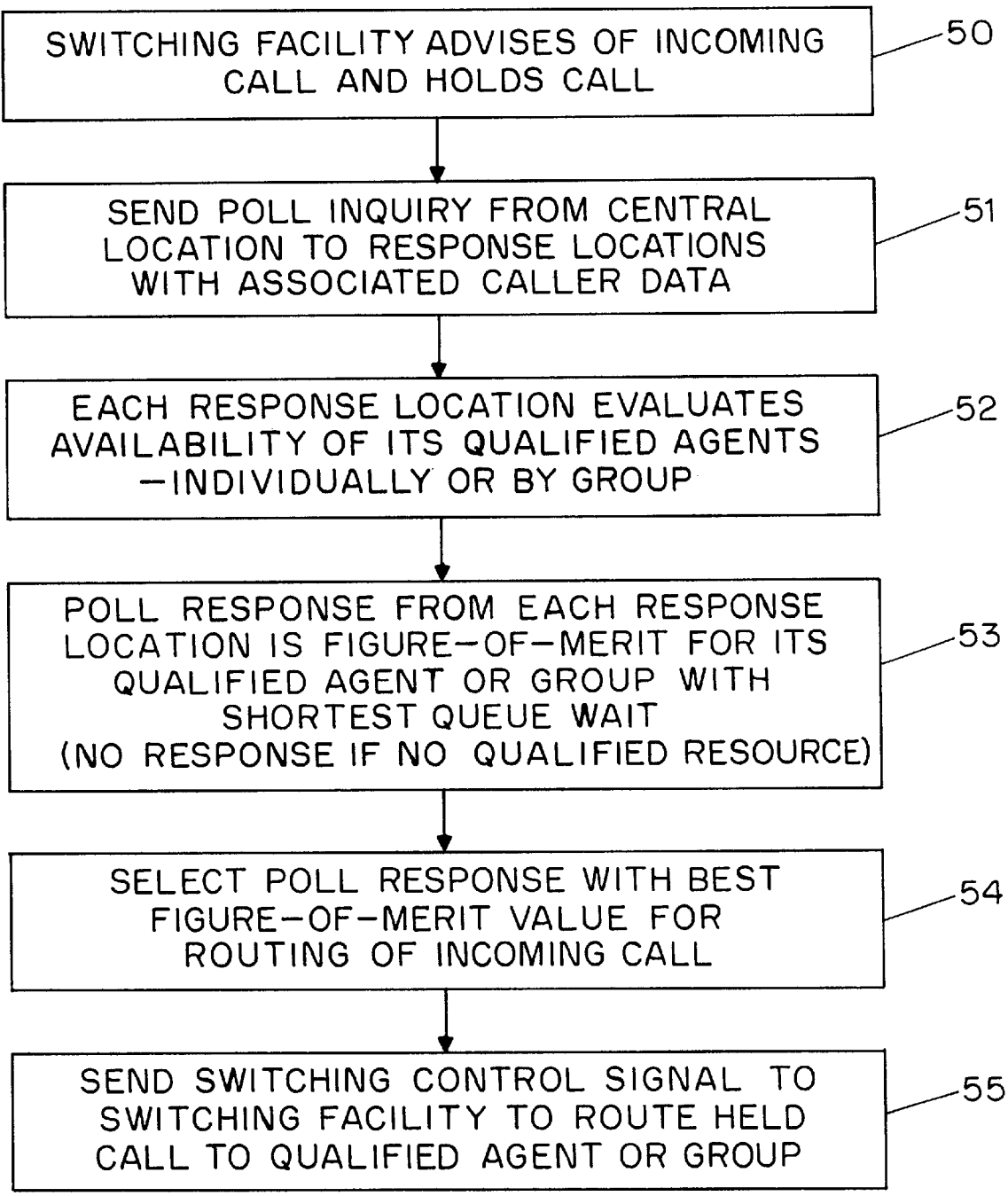
FIG. 2 is a flow chart illustrative of a call routing method in accordance with the invention.

Operational understanding of the invention will be enhanced by consideration of a method of call routing pursuant to the invention. An exemplary method as illustrated in FIG. 2 includes the following steps.

At 50, an incoming call is held by the switching facility (network 12), which provides a call arrival message to a central location (poll/selector unit 20) of the call routing system 10.

At 51, in response to the incoming call and any associated caller data, a poll inquiry is sent from unit 20 to a plurality of response locations (evaluate/controller units 24, 26, 28).

At 52, each unit 24, 26, 28 evaluates the current availability of its associated qualified response resources (e.g., agents 31, 32, 33 for unit 24).

At 53, each local unit 24, 26, 28 sends a poll response to central unit 20 indicating current availability of a qualified agent to respond to the call. Each poll response may take the form of a figure-of-merit value indicative of the shortest queue wait for a qualified agent at that response location (e.g., unit 24 determines agent 32 is qualified and has a short queue wait, and sends a figure-of-merit value of "4" as its poll response). If, in view of the associated caller data, there is no qualified agent available at its response location, unit 28 does not provide a poll response, in a currently preferred configuration. As noted above, where a group of qualified agents is served by a common queue the figure-of-merit value may be representative of the status of that queue and not the status of a specific agent.

At 54, a poll response which meets predetermined criteria is selected by central unit 20. Selection can be based on simply selecting the poll response representing the best figure-of-merit value (e.g.,if units 24 and 26 send poll responses with respective "4" and "9" figure-of-merit values, unit 20 selects the unit 24 poll response in this example).

At 55, a switching control signal is sent from central unit 20 to network 12 to cause the incoming call being held by the network to be routed to local unit 24. The call is then coupled to agent 32 for processing of the call. As discussed above with reference to step 53, availability of agent 32 to respond was the basis of the poll response provided by local unit 24.

In step 53 above, each poll response from a response location will typically represent the queue delay for the qualified agent at that location who currently has the shortest individual queue. Thus, regardless of how many agents may be associated with a particular location, a figure-of-merit poll response will be representative only of the qualified agent with the shortest queue. If there is no qualified agent (e.g., qualified to respond in view of the nature of the call as indicated by the associated caller data received) at a particular response location, no poll response need be sent from that location. As a result, unit 20 receives only poll responses representing figure-of-merit values for qualified agents. It is then a simple matter to select the best figure-of-merit value and send a corresponding switching control signal from unit 20 to network 12. With a basic understanding of this operation, detailed protocols and operational steps can be implemented by skilled persons as appropriate for particular applications and operating conditions and considerations. For example, where agents are grouped and each group is served by a common queue, a single figure-of-merit value from an evaluate/controller unit can be representative of the particular queue expected to provide the shortest response delay. Also, if the best figure-of-merit value is provided by two different poll responses, a round robin selection procedure can apply. If no associated caller data is provided for a particular incoming call, poll responses may merely indicate shortest queue regardless of agent qualifications.

On an overview basis, it will be seen that an objective is to accomplish routing of each incoming call within the time constraint imposed by the network for holding (parking) a call prior to routing (typically 250 ms, but may be longer or shorter). This leads to consideration of whether a local unit such as evaluate/controller 24, which has sent a poll response indicating agent 32 is available to handle a specific incoming call, should take action to reserve availability of agent 32 until the call is routed. In the interests of efficiency and simplicity, the currently preferred arrangement is not to provide for agent reservation action, on the presumption that with prompt action by unit 20 and network 12 the call will typically be routed to agent 32 prior to any change in the queue wait conditions for agent 32. Alternatively, if reservation action is desired in a particular implementation of the invention, access (e.g., to agent 32) can be reserved by unit 24 for a short predetermined time interval (e.g., 175 ms). Although call routing could then be monitored to determine if the incoming call is in fact routed for action by agent 32, it is currently preferred (if a reservation protocol is used) to merely remove the reservation at the end of the reservation time interval. Thus, even with reservation, no monitoring is required to determine whether the incoming call is actually received.

When a particular application for a call routing system is identified, many specific processing objectives, fail-safe routines and other operational considerations can be identified and appropriately addressed by skilled persons in implementation of the invention. For example, as discussed above, rather than routing an incoming call from network 12 to response resource agent 38 via unit 28, in some applications it may be desirable to route such call directly to agent 38 via direct path 40, shown dashed in FIG. 1. This approach can be implemented by including in the poll response from unit 28 data identifying the telephone address of agent 38, in addition to a figure-of-merit value indicating current availability of the agent.

The existing high level of development of technology relating to call routing and telephony, internet and other systems enables skilled persons to readily implement systems and methods in accordance with the invention. The following discussion addresses examples of currently preferred implementation of particular units of the system.

In providing operation as described above, evaluate/controllers 24, 26, 28 may each typically include a local controller/router unit, having suitable microprocessor and software capabilities, and associated data storage means and network interfaces. A wide-area network interface may be included for communication with a public switched telephone network (PSTN) and a local area network interface may be included to enable communication with PBX facilities and with a plurality of response resources (e.g., units 34, 35) which may include individual agents, agents arranged in groups and IVR systems, commonly located or geographically separated.

Poll/selector unit 20 may include a computer unit, having suitable microprocessor and software capabilities, arranged to implement selection based on predetermined criteria (e.g., best figure-of-merit value) and to develop switching control signals to instruct network 12 as to call routing. Unit 20 may also include suitable interfaces for communication with network 12, units 24, 26, 28, etc., and appropriate data storage means.

Additional component units and capabilities may be included or substituted in units 20,24, 26 and 28 as appropriate for particular applications. The call routing system may also include additional evaluate/controller units and other assemblies and capabilities. For example, system 10 of FIG. 1 may be arranged to receive incoming calls from additional communication systems and switching facilities, such as network 14 shown dashed.

While there have been described the currently preferred embodiments of the invention, those skilled in the art will recognize that other and further modifications may be made without departing from the invention and it is intended to claim all modifications and variations as fall within the scope of the invention.

What is claimed is:

1. A call routing system, responsive to an incoming call held by a switching facility, comprising:
    a poll/selector responsive to an incoming call and associated caller data (i) to send a poll inquiry to a plurality of evaluate/controllers, (ii) to receive poll responses from at least one evaluate/controller indicating a current capability to respond to that call, and (iii) to provide a switching control signal based on selection of a poll response which meets predetermined criteria;
    a plurality of response resources capable of responding to incoming calls;
    a plurality of evaluate/controllers each with communication link to at least one said response resource and responsive to said poll inquiry to provide a poll response indicative of current availability of a response resource to respond to that call; and a communication link between the poll/selector and said switching facility to couple said switching control signal to control the routing of that call.

2. A call routing system responsive to an incoming call held by a switching facility to route that call to one of a plurality of response resources capable of responding thereto, comprising;

a poll/selector responsive to an incoming call and associated caller data (i) to send a poll inquiry to a plurality of evaluate/controllers, (ii) to receive poll responses from at least one evaluate/controller indicating a current capability to respond to that call, and (iii) to provide a switching control signal based on selection of a poll response which meets predetermined criteria; and a plurality of evaluate/controllers each arranged to be linked to a group of said response resources and each responsive to said poll inquiry to provide a poll response indicative of current availability of a linked response resource to respond to that call;

said poll/selector arranged to couple said switching control signal to control routing of that call from the switching facility.

3. A call routing system as in claim 2, wherein in response to a poll inquiry each said evaluate/controller provides one of: no poll response; a single poll response indicative of current availability of one particular response resource evaluated by said evaluate/controller as most available among its linked response resources capable of responding to that call.

4. A call routing system as in claim 2, wherein said poll/selector is arranged to send a poll inquiry which includes information representative of said caller data.

5. A call routing system as in claim 2, wherein each said evaluate/controller is arranged to provide a poll response indicative of current queue wait for a response resource capable of responding, based on the caller data associated with that call.

6. A call routing system as in claim 5, wherein each said evaluate/controller is arranged to provide no poll response in the absence of availability of a linked response resource capable of responding, based on the caller data associated with that call.

7. A call routing system as in claim 5, wherein said evaluate/controller is arranged to provide a poll response indicative of current queue wait, where queue wait is representative of one of: queue length; estimated queue waiting time.

8. A call routing system as in claim 5, wherein said poll/selector is arranged to provide a switching control signal indicative of a poll response selected on the basis of a predetermined criteria representative of shortest queue wait.

9. A call routing system as in claim 2, wherein said poll/selector is arranged to provide a switching control signal indicative of a poll response selected on the basis of a predetermined criteria representative of shortest queue wait.

10. A call routing system as in claim 2, wherein the call is routed by the switching facility to an evaluate/controller which is arranged to cause that call to be coupled to the particular response resource whose current availability to respond was the basis for the poll response selected by the poll/selector.

11. A call routing system as in claim 2, wherein the call is routed by the switching facility to the particular response resource whose current availability to respond was the basis for the poll response selected by the poll/selector.

12. A call routing system as in claim 2, wherein each said evaluate/controller provides one of: no poll response; a single poll response in the form of a figure-of-merit value.

13. A call routing system as in claim 2, wherein each said evaluate/controller is arranged to reserve a response resource when a poll response is provided on the basis of availability of that response resource.

14. A call routing system as in claim 13, wherein each said evaluate/controller is arranged to terminate reservation of a response resource at the end of a predetermined time period, regardless of whether a call is routed to said evaluate/controller within that time period.

15. A call routing system, responsive to an incoming call held by a switching facility to route that call to one of a plurality of response resources capable of responding thereto, comprising:

a poll/selector responsive to an incoming call (i) to send a poll inquiry to a plurality of evaluate/controllers, (ii) to receive poll responses from at least one evaluate/controller indicating a current capability to respond to that call, and (iii) to provide a switching control signal based on selection of a poll response representing the best figure-of-merit value of all poll responses received; and a plurality of evaluate/controllers each arranged to be linked to a group of said response resources and each responsive to said poll inquiry to provide a poll response comprising a figure-of-merit value indicative of current availability of a linked response resource to respond to that call;

said poll/selector arranged to couple said switching control signal to control routing of that call from the switching facility.

16. A call routing system as in claim 15, wherein said poll/selector is arranged to send a poll inquiry which includes information representative of caller data associated with that incoming call.

17. A call routing system as in claim 16, wherein each said evaluate/controller is arranged to provide a poll response indicative of current queue wait for a response resource capable of responding, based on the caller data associated with that call.

18. A call routing system as in claim 17, wherein each said evaluate/controller is arranged to provide no poll response in the absence of availability of a linked response resource capable of responding, based on the caller data associated with that call.

19. A call routing method, using localized response capability evaluation, comprising the steps of:

(a) in response to an incoming call held by a switching facility and associated caller data, sending a poll inquiry from a central location to a plurality of response locations;

(b) at each response location, evaluating the current availability of at least one response resource to respond to that call;

(c) from at least one response location, sending to said central location a poll response indicative of current availability of a response resource to respond to that call;

(d) at said central location, selecting a poll response which meets predetermined criteria; and (e) sending a switching control signal from said central location to control the routing of that call from the switching facility.

20. A call routing method as in claim 19, including the additional step of:
   (f) at the selected response location, coupling the routed call to the particular response resource whose current availability to respond was the basis for a poll response from that response location.

21. A call routing method as in claim 19, wherein in step (c) from each response location there is sent one of: no poll response; a single poll response in the form of a figure-of-merit value.

22. A call routing method as in claim 21, wherein in step (d) said criteria is best figure-of-merit value.

23. A call routing method as in claim 19, wherein step (a) includes incorporating information representative of said caller data in the poll inquiry.

24. A call routing method as in claim 19, wherein step (b) comprises evaluating the current availability only of response resources capable of responding, based on the caller data associated with that call.

25. A call routing method as in claim 24, wherein in step (c) no poll response is provided in the absence of a response capable of responding, based on the caller data associated with the call.

26. A call routing method as in claim 19, wherein in step (c) the poll response is indicative of current queue wait, where queue wait is representative of one of: queue length; estimated queue waiting time.

27. A call routing method as in claim 19, wherein in step (e) the switching control signal directs routing of the call to the response location originating the poll response selected in step (d).

28. A call routing method as in claim 19, wherein in step (c) each poll response is also indicative of the telephone address of that response resource, and in step (e) the switching control signal directs routing of the call to that response resource, upon whose availability the poll response selected in step (d) was based.

29. A call routing method as in claim 19, wherein step (c) also includes reserving availability of that response resource.

* * * * *